United States Patent
Elliott

(10) Patent No.: US 9,408,111 B2
(45) Date of Patent: Aug. 2, 2016

(54) TIME-SLICED WIFI ASSOCIATIONS FOR MAKE-BEFORE-BREAK HANDOVER

(71) Applicant: Intel Corporation, Santa Clara, CA (US)

(72) Inventor: Brent Elliott, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 14/127,599

(22) PCT Filed: May 29, 2013

(86) PCT No.: PCT/US2013/043031
§ 371 (c)(1),
(2) Date: Dec. 19, 2013

(87) PCT Pub. No.: WO2014/193354
PCT Pub. Date: Dec. 4, 2014

(65) Prior Publication Data
US 2015/0131612 A1    May 14, 2015

(51) Int. Cl.
*H04W 36/00* (2009.01)
*H04W 60/00* (2009.01)

(52) U.S. Cl.
CPC ...... *H04W 36/0016* (2013.01); *H04W 36/0088* (2013.01); *H04W 60/00* (2013.01)

(58) Field of Classification Search
None
See application file for complete search history.

(56) References Cited

U.S. PATENT DOCUMENTS

| | | | |
|---|---|---|---|
| 2004/0077341 A1* | 4/2004 | Chandranmenon et al. | 455/418 |
| 2004/0127208 A1* | 7/2004 | Nair | H04W 36/14 455/420 |
| 2008/0096561 A1* | 4/2008 | Liu et al. | 455/436 |
| 2009/0034470 A1* | 2/2009 | Nagarajan et al. | 370/331 |
| 2009/0270105 A1* | 10/2009 | Kakumaru | 455/436 |
| 2009/0285175 A1* | 11/2009 | Nix | 370/331 |
| 2010/0222059 A1 | 9/2010 | Pani et al. | |
| 2011/0026636 A1 | 2/2011 | Ko et al. | |
| 2011/0051692 A1 | 3/2011 | Sambhwani et al. | |
| 2012/0008535 A1* | 1/2012 | Kuehnel | 370/311 |
| 2012/0072955 A1 | 3/2012 | Cho et al. | |
| 2014/0022918 A1* | 1/2014 | Guo et al. | 370/252 |

OTHER PUBLICATIONS

"International Application Serial No. PCT/US2013/043031, International Search Report mailed Feb. 26, 2014", 4 pgs.
(Continued)

*Primary Examiner* — Faruk Hamza
*Assistant Examiner* — Cassandra Decker
(74) *Attorney, Agent, or Firm* — Schwegman Lundberg & Woessner, P.A.

(57) ABSTRACT

Embodiments of a WiFi system and method for time-sliced associations for make-before-break handover in the WiFi system are generally described herein. In some embodiments, the method monitors metrics of a serving channel of the WiFi system to determine whether to increase a channel scanning rate of target channels of the WiFi system. The channel scanning rate of the target channel may be increased in response to the metrics. A time-sliced association with one or more target cells on the target channel may be performed while an association with a serving cell on the serving channel may be maintained. The wireless client may be transitioned from the serving cell to the target cell in response to the metrics while obscuring the complexity from the device operating system and active applications.

20 Claims, 4 Drawing Sheets

(56) References Cited

OTHER PUBLICATIONS

"International Application Serial No. PCT/US2013/043031, Written Opinion mailed Feb. 26, 2014", 5 pgs.

"International Application Serial No. PCT/US2013/043031, International Preliminary Report on Patentability mailed Dec. 10, 2015", 7 pgs.

* cited by examiner

TIME-SLICED WIFI ASSOCIATIONS FOR MAKE-BEFORE-BREAK HANDOVER

PRIORITY APPLICATION

This application is a U.S. National Stage Application under 35 U.S.C. 371 from international Application No. PCT/US2013/043031, filed May 29, 2013, which is hereby incorporated by reference in its entirety.

TECHNICAL FIELD

Embodiments pertain to wireless networks. Some embodiments relate to WiFi handover.

BACKGROUND

IEEE 802.11 is a set of standards for implementing wireless local area network (WLAN) communications. These standards provide the basis for wireless network equipment approved and licensed as WiFi equipment.

WiFi networks typically use access points to wirelessly communicate with either mobile communication devices (e.g., smart phones, computers, tablet computers). The access points can be connected to a wired network giving the access point access to the Internet. The mobile communication device can then access the Internet through communication with the access point.

The transmission area of an access point can be referred to as a cell. The cells are typically designed to be relatively small in order to provide greater capacity and enable lower power usage for the mobile communication devices. Due to this relatively small size, handover from a serving cell (i.e., present cell) to a target cell (i.e., possible future cell) can occur relatively frequently, even when the mobile communication device is moving at walking velocities.

The process for handover from a serving WiFi cell to a target WiFi cell can take many seconds in the case of inter-extended service set identification (ESSID) handover. The delay can be caused, at least in part, while association, authentication and Dynamic Host Configuration Protocol (DHCP) procedures are completed. Many problems can occur during this handover that can result in even more time being used. For example, the mobile communication device may fail one or more of the association, authentication, or DHCP procedures on the target cell.

Additionally, the target cell, once successfully connected, may have non-functioning backhaul or hotlining that prevents Internet access or inadequate performance by the mobile communication device. This can result in unavailable, delayed, or inadequate Internet service for the mobile communication device. A significant delay in handover between cells can result in an unacceptable end-user experience as well as Operating System and Application errors.

Thus there are general needs for improved WIFI handover methods. There are also general needs for decreasing a time of WIFI handover.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
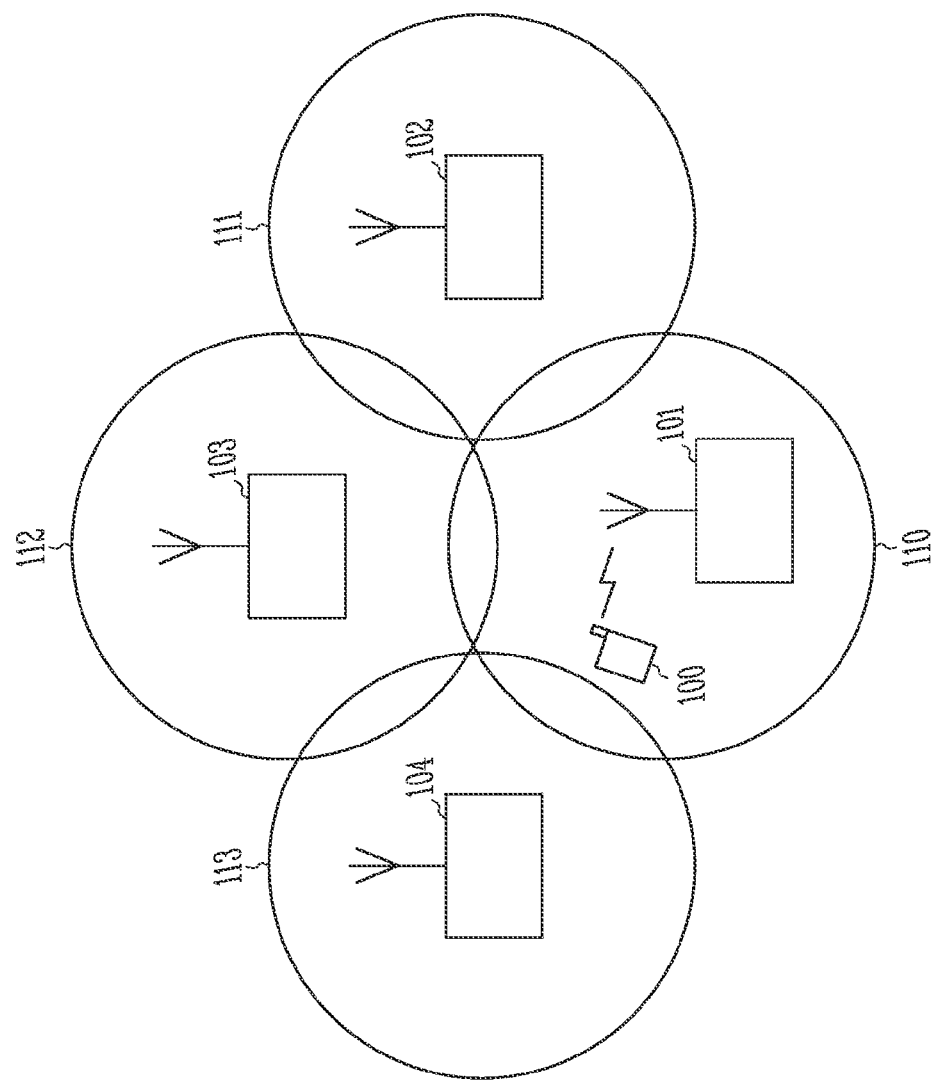
FIG. 1 illustrates various network elements of a wireless network in accordance with some embodiments.

FIG. 1 illustrates various network elements of a wireless communication network (e.g., WiFi network) in accordance with some embodiments. The wireless communication network includes one or more wireless communication stations 100-104 that may include a wireless client 100 and a plurality of access points (APs) 101-104 that may communicate over one or more wireless channels in accordance with IEEE 802.11 communication techniques.

The wireless client 100 may be any mobile computing device having a wireless communication capability that may be non-stationary. Such a computing device may include smart telephones, tablet computers, lap top computers, and other computing devices that have the ability to communicate with the access points 101-104 over one or more wireless channels using one or more communication techniques (e.g., IEEE 802.11).

A single AP 101-104 with all associated wireless clients 100 may be referred to in the art as a basic service set. The AP 101-104 may act as a master to control the wireless clients 100 within that particular BSS. A simple BSS, for example, could be the wireless client 100 and the AP 101 with which it is communicating.

Each BSS may be uniquely identified by a basic service set identification (BSSID). In other words, the BSSID may be associated with only one BSS. For a BSS operating in an infrastructure mode, the BSSID may be the media access control (MAC) address of the AP.

An extended service set (ESS) may be a set of two or more interconnected wireless BSS's and integrated wired local area networks (LANs) that appear as a single BSS to the logical link control layer at the wireless client 100. Each ESS may be uniquely identified by the ESSID. The BSSs may work on the same channel or different channels.

The APs 101-104 may have fixed locations. The APs 101-104 may be part of a stationary network that may be coupled to a larger network. For example, the APs 101-104 may be part of a wired network that is coupled to the Internet. The wireless client 100 may then access the larger network by communicating over the wireless communication channels with one or more of the APs 101-104.

The signal transmission from the APs 101-104 may form basic service areas (BSA) or cells 110-113 around the APs 101-104. When the wireless client 100 is within communication distance of a particular AP 101-104, it may be assumed to be within one of the cells 110-113. For example, FIG. 1 shows the wireless client 100 to be within a cell 110 created by the AP 101. The cell 110 with which the wireless client 100 is presently communicating may be considered to be the serving cell 110.

The IEEE 802.11 communication standards provide for allowing the wireless clients 100 to be off-channel for recurring periods of time. The wireless client 100 may use this time for scanning, probing, and power savings purposes. The wireless client 100 may also use this time to attempt association with another cell 110-113 (i.e., target cell). For example, when the wireless client 100 moves from the serving cell 110 to a target cell 111-113, the wireless client 100 may maintain the existing WiFi association with the serving cell 110 while simultaneously attempting to establish a connection with one or more target cells 111-113.

After establishing an association with one or more target cells 111-113 in parallel (e.g., time-sliced association), the wireless client 100 may perform the association, authentication, Dynamic Host Configuration Protocol (DHCP) operations, and Quality of Experience (QoE) analysis of the target cell or cells 111-113. The association may comprise the wireless client 100 storing an identification (e.g., IP address, MAC address) of the target cells 111-113. The authentication may comprise the wireless client 100 determining if the identification is authentic by comparing the identification with known good identifications. DHCP is a network protocol used to configure devices that may be connected to a network so that they can communicate on that network using Internet Protocol (IP).

It may also be known in the art that QoE may be a measure of the actual experience a user has when they are using a particular connection to an AP 110-114. For example, a client 100 might see a Wi-Fi signal from an AP 110-114, however the AP's connection to a larger network might not be working. QoE analysis may look at such metrics as channel signal strength, end-to-end link quality and bandwidth, wireless client battery life, cost of connectivity, application choices, user preference, or measurement of real or synthetic application performance such as throughput testing or voice MOS scoring.

When the wireless client 100 has information about one or more target cells 111-113 that are able to deliver adequate QoE, the WiFi handover can occur from the serving cell to the target cell prior to breaking the current connection with the serving cell (i.e., make-before-break). A make-before-break handover method may be used in both inter-ESSID and intra-ESSID cases. An inter-ESSID handover may be accomplished in some embodiments where there may not be centralized coordination of the handover and an authentication context may not be reused. An intra-ESSID handover may be used in some embodiments where the same wireless client credentials may be used more than once on the same network.

In other embodiments, some internet service providers may not allow the use of the same wireless client credentials more than once on the same network. In such an embodiment, selection of a new ESSID by the wireless client 100 may not occur. Thus, when the wireless client 100 begins to move out of range of the serving cell 110, and connections are poor enough or the connection with the AP 101 breaks, the wireless client 100 may make the first attempt to connect with another AP with the same ESSID without considering other ESSIDs. Some embodiments enable substantially simultaneous authentications or to reuse the existing authentication context in the WiFi authentication back-end to improve interoperability and performance of an intra-ESSID handover. The new AP 101-104 may be transitioned to more quickly by the wireless client 100 with a make-before break handover in an intra-ESSID handover where the inter-ESSID optimizations described above are not available.

In some embodiments, a unique MAC address may be used for each simultaneous AP association. The quantity of MAC addresses used may depend on a maximum quantity of simultaneous AP connections that may be maintained by the wireless client 100.

The make-before-break handover methods may operate when both the serving cell and the target cell(s) are on the same channel or different channels. When the serving cell and the target cell(s) are on the same channel, a benefit may exist that includes the handling of received events for simultaneous virtual associations between the wireless client 100 and cells 110-114 since frames from both the serving cell 110 and the co-channel target cells 111-114 may be decoded substantially simultaneously while on the channel.

In order to reduce a performance impact with an active association with the serving cell 110, a time spent attempting multiple associations with target cells 111-114 may be scheduled. Considerations about when to perform target cell associations and the amount of time to spend on potential target cell interactions may be based on a number of considerations. These considerations may include the QoE or signal conditions of the serving cell, the economic cost of the serving cell connection, the priority of the serving cell, current network utilization by the wireless client 100, or the credentials used by the serving cell relative to alternative cells.

Figure 2:
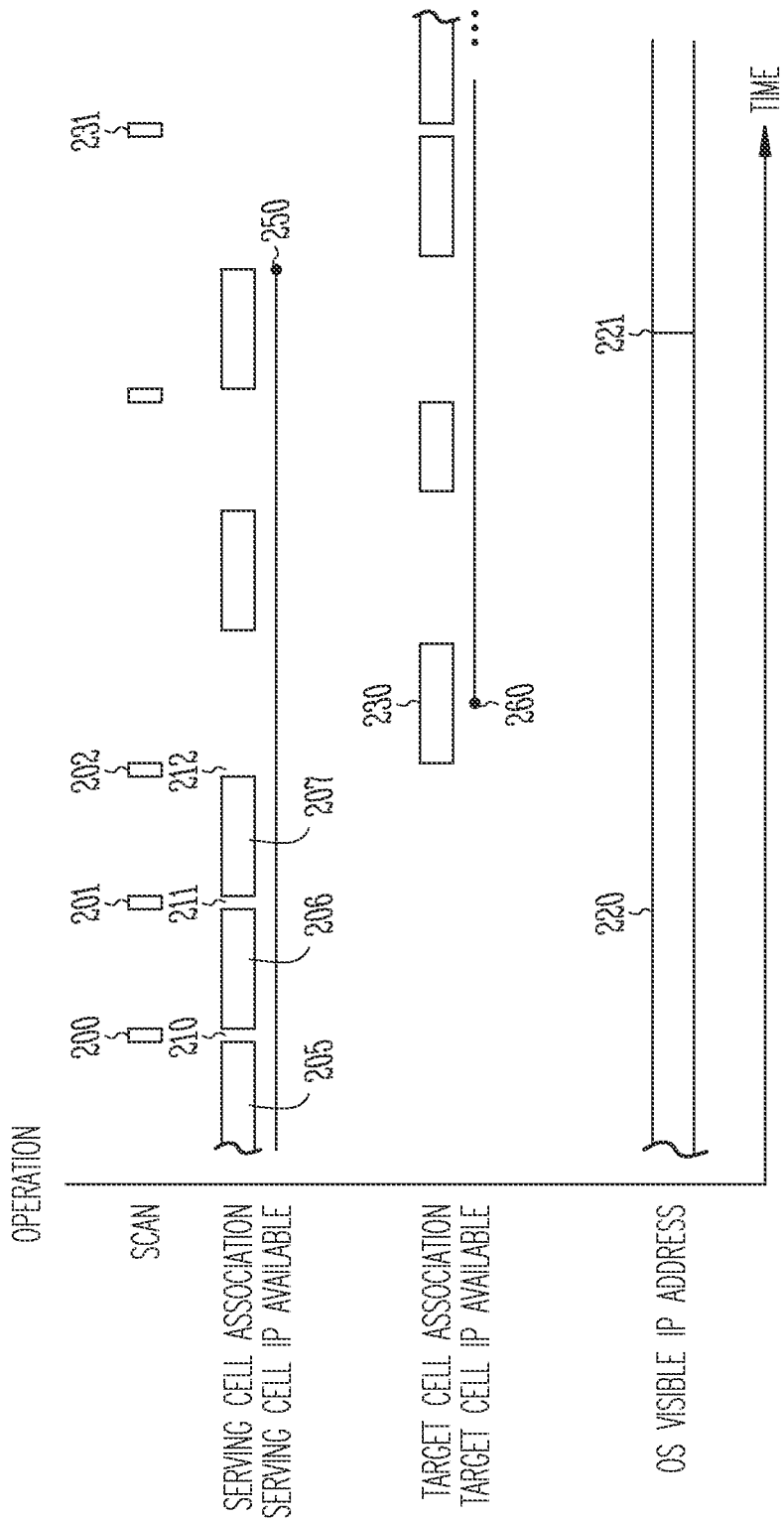
FIG. 2 illustrates an operational diagram in accordance with some embodiments.

FIG. 2 illustrates an operational diagram in accordance with some embodiments of a time-sliced WiFi associations for a make-before-break handover. This diagram illustrates the operations of a wireless client 100 and an access point 101-104. The y-axis lists the various operations being performed while the x-axis represents time.

FIG. 2 shows a number of blocks of serving cell association time 205-207 during which the wireless client interacts with or is available for its currently associated AP. Between these blocks of serving cell association time 205-207, the wireless client leaves the serving channel and performs scan operations 200-202 on other appropriate channels. Typically, WiFi equipment can tune only one channel at a particular time. Thus, while the wireless client is off the serving channel, it may not interact with the serving cell, resulting in the illustrated breaks 210-212 between serving cell association times 205-207.

When signal conditions degrade between the wireless client and the serving cell, the wireless client may increase the scanning frequency. Since termination of a session with an AP may be a wireless client-based decision, instead of waiting for service to be lost completely, the wireless client may start the transfer process to an association with a new AP by increasing the scan frequency.

During one scan operation 202, a target cell association time 230 may occur as the wireless client interacts with the target cell. In the interest of clarity, only one target cell associate time 230 is shown. Different embodiments may use one or more scan operations 202 to access multiple target cells in parallel that would result in multiple target cell association times 230. In this manner, the wireless client may time-slice between channels and the corresponding target cell associations.

During the illustrated target cell association time 230, the target cell may be associated, authenticated, and the DHCP address may be received. At a later time, when one or more triggers are met as described subsequently, the active connection from the point of view of the wireless client operating system (OS) is transitioned 221 to the new connection at the new IP address of a new serving cell. After transition to the new serving cell, the wireless client may then resume normal, periodic scanning 231.

During the scanning 200-202 and target cell authentication 230 process, the wireless client OS may not be aware of any IP address changes. Even though the target cell(s) IP addresses are made available 260, the client OS sees only the visible serving cell IP 220, the IP addresses are masked from the wireless client OS. This may reduce confusion for the wireless client 100 Operating System and any applications running on the wireless client since the serving cell IP address is always available and unmodified 250 during the transition process.

Figure 3:
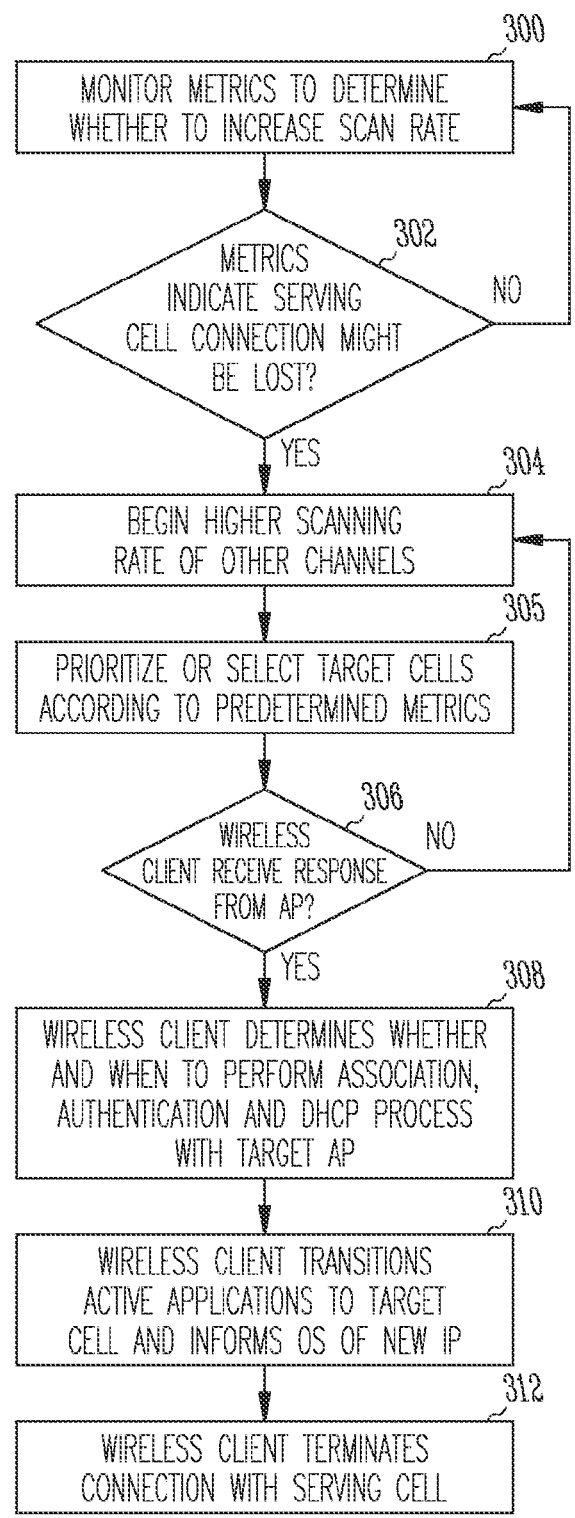
FIG. 3 illustrates a flowchart of a method for time-sliced WiFi associations for make-before-break WiFi handover in accordance with some embodiments.

FIG. 3 illustrates a flowchart of a method for a time-sliced WiFi associations make-before-break handover in accordance with some embodiments. The method may monitor a serving channel for low signal levels, Quality of Service (QoS) (e.g., low throughput, number of dropped packets, number of bit errors, latency, jitter, out-of-order delivery of packets), and/or other metrics 300 to determine when to start increasing the scanning rate of target channels. When one of these metrics has reached a predetermined threshold indicating a degradation in serving channel quality (e.g., the serving cell connection might be lost) 302, the wireless client may begin a higher scanning rate of target channels 304 in order to perform the time-sliced associations with the prioritized target cells on the target channels. Target cells may be prioritized or selected from all available cells according to predetermined priority metrics 305 such as signal strength, channel utilization, signal to noise ratio, credential availability, historical performance with the ESSID or BSSID dependent or independent of location, information contained in the WiFi beacon or retrieved from the AP via queries such as Access Network Query Protocol (ANQP) as defined in IEEE 802.11 U, or user preferences. For example, if the signal level drops below a predetermined signal threshold level, if the QoS includes a large number of dropped packets, or any of the other metrics indicate that the serving cell connection may soon drop, the scanning rate may be increased.

The scanning may include the wireless client sending out frames on one or more other channels. The wireless client waits for a response from potential target APs 306. The target APs of the target cells that are able to receive the frames from the wireless client may then respond to the wireless client scanning with an appropriate frame or frames that enables the wireless client to identify the target AP and determine QoE and/or signal strength of the target cell.

Once the wireless client receives the response from the target AP 306, it may then determine whether to perform an association, authentication, and DHCP process 308 with the target AP. The wireless client may also determine when to perform the association, authentication, and DHCP process 308. The identity of the target AP may be used by the wireless client to check a metric history of that particular AP or attributes of a cell associated with the AP.

In some embodiments, the wireless client may track previous associations with APs. For example, the wireless client may store particular metrics for each AP with which it is or has been associated. These metrics may include a time it took to associate with the AP, a time for transitioning to the AP, location of the AP, previous QoE with the AP, and signal conditions associated with the AP. While the wireless client is scanning and determines the identification of one or more APs, it may use any stored metrics associated with that particular AP to filter or prioritize target cell selection or determine whether to continue with the association process. For example, if one or more of the associated metrics indicates that the resulting association might not be adequate for the wireless client, the wireless client might deprioritize or ignore this AP and either continue to scan or review the stored metrics for other APs.

Once the wireless client has made a target cell association, it has to determine when to transition active applications (e.g., mail, web browser, VoIP) from the serving cell to the target cell. The wireless client may use many different factors in making this determination.

In a simple case, the wireless client might simply monitor the signal levels of both the serving cell and a target cell. When the signal level of the serving cell drops below a particular threshold or the target cell signal level goes above a particular threshold, the wireless client might make the transition to become associated with the target cell.

In another embodiment, the tracked history, as described previously, may be used to determine how aggressive to make the transition from the serving cell to the target cell. For example, if the target cell has a past history of taking longer than other cells to be associated with a wireless client, the wireless client might transition to that particular target cell sooner than is necessary. If the tracked history of one target cell is substantially worse than the history of surrounding target cells, the wireless client might wait until the other surrounding target cells have a stronger signal and/or better QoS before transitioning from the serving cell.

The wireless client might also monitor sensors (e.g., accelerometer, compass, GPS) to determine a location, speed, and/or direction of movement. The wireless client can then determine that if the wireless client is substantially stationary or not moving very fast, the transition to the target cell might be delayed and/or the signal level threshold that triggers the transition might be lowered. However, if the wireless client is moving more rapidly, the wireless client might transition sooner and/or the signal level threshold that triggers the transition might be increased.

In another embodiment, the wireless client might only evaluate a transition to cells that it has credentials to access. For example, if the user of the wireless client only has permission to access a certain internet service provider or has been barred from certain internet service providers, the wireless client may take this into account when determining which responding, target cells have the potential to be serving cells.

Once the wireless client has determined that a transition to a target cell is to be made and when to perform the transition to the target cell, the wireless client transitions the active applications to the target cell and informs the operating system (OS) of the new IP address 310. Up to the point of association with the target cell, the OS has not been aware of the new IP address in order to reduce confusion with the Operating System and active applications. Once the transition is to be made, the OS is now informed of the new IP address so that the active applications can be informed of the new IP address.

The wireless client may also terminate the connection with the serving cell 312 after becoming associated with the target cell. This make-before-break transition enables the active applications and the OS of the wireless client to continue operating without interruption during the transition. Active target cell associations may also be re-evaluated using similar target cell selection metrics and criteria to determine when to disassociate an active target cell association or to modify the amount of time allocated to the association for evaluation.

Figure 4:
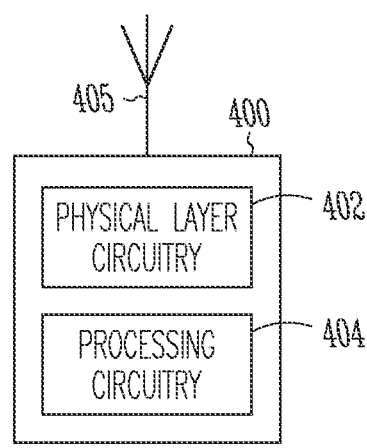
FIG. 4 illustrates a functional diagram of a wireless communication station in accordance with some embodiments.

FIG. 4 is a functional diagram of a communication station 400 in accordance with some embodiments. The communication station 400 may be suitable for use as a wireless client 100 (FIG. 1) or any of the access points 101-104 (FIG. 1), although other configurations may also be suitable.

Communication station 400 may include physical layer circuitry 402 to communicate wirelessly with access points, mobile communication devices, and other communication stations over an antenna 405. Communication station 400 may also include processing circuitry 404 coupled to the physical layer circuitry 402 to perform other operations described herein.

In accordance with embodiments, the physical layer circuitry 402 may be configured to transmit and receive handover frames between communication stations. The physical layer circuitry 402 may also be configured to transmit and receive acknowledgments as well as other communications between communication stations.

In accordance with embodiments, the processing circuitry 404 may be configured to store and track metrics of WiFi cells. The processing circuitry 404 may also be configured to calculate whether and when to transition from a serving cell to a target cell based on stored metrics and/or current signal levels. The processing circuitry 404 may also include operations performed by one or more processor and/or logic.

Although communication station 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of communication station 400 may refer to one or more processes operating on one or more processing elements.

In some embodiments, communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, a communication station may include one or more of a keyboard, a display, a non-volatile memory port, multiple antennas, a graphics processor, an application processor, speakers, and other mobile device elements. The display may be an LCD or LED (e.g., organic light emitting diode) screen, including a touch screen.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

ADDITIONAL NOTES AND EXAMPLES

Example 1 is a method for time-sliced associations for make-before-break handover in a communication system, the method comprises a wireless client monitoring a serving channel of the communication system to determine whether to perform the time-sliced association, performing a time-sliced association with a target cell on a target channel while maintaining an association with a serving cell on the serving channel and while masking the time-sliced association from an operating system of the wireless client, and transitioning the wireless client from the serving cell to the target cell in response to the metrics.

In Example 2, the subject matter of Example 1 can optionally include increasing a channel scanning rate of the target channel in response to one or more metrics of the serving channel.

In Example 3, the method can optionally include establishing an association with one or more target cells on one or more target channels in parallel while maintaining the association with the serving cell.

In Example 4, the subject matter of Example 1 can optionally include one or more metrics comprising channel signal strength, end-to-end link quality and bandwidth, wireless client battery life, cost of connectivity, application choices, user preference, or measured synthetic or real application performance metrics.

In Example 5, the subject matter of Example 1 can optionally include transitioning the wireless client from the serving cell to the target cell comprises informing an operating system of the wireless client of an internet protocol address for the target cell.

In Example 6, the subject matter of Example 1 can optionally include transitioning the wireless client from the serving cell to the target cell comprises transitioning active applications on the wireless client to the internet protocol address for the target cell.

In Example 7, the subject matter of Example 1 can optionally include the wireless client terminating the association with the serving cell after transitioning the wireless client to the target cell.

In Example 8, the subject matter of Example 1 can optionally include performing the time-sliced association with the target cell comprises performing an association, authentication, and Dynamic Host Configuration Protocol process.

In Example 9, the subject matter of Example 1 can optionally include increasing the channel scanning rate of the target channel in response to one or more metrics comprises increasing the channel scanning rate of a plurality of target channels in parallel.

In Example 10, the subject matter of Example 1 can optionally include performing the time-sliced association with the target cell on the target channel while maintaining the association with the serving cell on the serving channel comprises the wireless client leaving the serving channel to perform the time-sliced association with the target cell.

In Example 11, the subject matter of Example 1 can optionally include prioritizing target cells according to predetermined priority metrics.

Example 12 is a method for time-sliced WiFi associations for make-before-break handover in a WiFi system, the method can comprise a wireless client monitoring a serving channel, associated with a serving access point, until an indication of degradation in serving channel quality, increasing a scanning rate of a plurality of target channels in response to the indication of degradation in serving channel quality, each of the plurality of target channels associated with a target access point, performing a time-sliced association with at least one of the plurality of access points while maintaining an association with the serving access point, and transitioning the wireless client from the serving access point to a target access point of the plurality of target access points in response to the indication of degradation of the serving channel and a metric history of the target access point.

In Example 13, the subject matter of Example 12 can optionally include the wireless client storing one or more historical metrics for each of the plurality of target access points with which it has been associated.

In Example 14, the subject matter of Example 13 can optionally include the historical metrics comprising a time it took to associate with each access point, how quickly a transition to each access point was performed, previous quality of experience with each access point, and signal conditions associated with each access point.

Example 15 is a wireless client that for operating in a communication system, the wireless client comprising, physical layer circuitry to scan at least one associated channel of a plurality of access points while maintaining an association with a serving access point, processing circuitry to perform a time-sliced association with a target access point on its at least one associated channel while maintaining an association with the serving access point on a serving channel and masking the time-sliced association from an operating system of the wireless client, and the processing circuitry to control a transition from the serving access point to the target access point in response to an indication of degradation in quality with the serving channel.

In Example 16, the subject matter of Example 15 can optionally include the wireless client informs an operating system of the wireless client of a new internet protocol address of the target access point only after an association with the target access point has been accomplished.

In Example 17, the subject matter of Example 16 can optionally include the association with the target access point comprises an association, an authentication, a dynamic host configuration protocol operation, and a Quality of Experience analysis of the at least one associated channel of the target access point.

In Example 18, the subject matter of Example 17 can optionally include the wireless client is further configured to determine the Quality of Experience analysis by determining channel signal strength, end-to-end link quality, channel bandwidth, wireless client battery life, cost of connectivity, application choices, user preferences, or measured synthetic or real application performance metrics.

In Example 19, the subject matter of Example 15 can optionally include the serving access point and the target access point are configured to have different extended service set identifications.

In Example 20, the subject matter of Example 15 can optionally include the serving access point and the target access point configured to have a same extended service set identification.

Example 21 is a non-transitory computer-readable storage medium that stores instructions for execution by processing circuitry of a wireless client to perform time-sliced associations for a make-before-break handover in a WiFi system, the operations to perform the handover: monitor metrics of a serving channel of the WiFi system to determine whether to perform the time-sliced associations with one or more target access points over a respective one or more target channels, perform the time-sliced association with the one or more target access points using the respective one or more target channels while maintaining an association with a serving access point using the serving channel and while masking the time-sliced associations with an operating system of the wireless client, and transition from the serving access point to a target access point in response to the metrics.

In Example 22, the subject matter of Example 21 can optionally include the operations to perform the handover to further increase the channel scanning rate of the respective one or more target channels in response to the metrics comprises.

In Example 23, the subject matter of Example 21 can optionally include the operations to perform the handover to further prioritize the one or more target cells according to predetermined priority metrics.

In Example 24, the subject matter of Example 21 can optionally include the operations to perform an analysis of a metric history of the target access point, and control a time of the transition from the serving access point to the target access point in response to the metric history.

Example 25 is a wireless client configured to perform time sliced WiFi associations in a WiFi system, the wireless client comprising means for monitoring metrics of a serving channel of the WiFi system to determine whether to perform the time-sliced WiFi association, means for performing a time-sliced association with a plurality of target cells on a plurality of respective target channels while maintaining an association with a serving cell on the serving channel, means for masking the time-sliced associations from an operating system of the wireless client while performing the time-sliced associations, and means for transitioning the wireless client from the serving cell to a target cell of the plurality of target cells in response to the metrics.

In Example 26, the subject matter of Example 21 can optionally include means for prioritizing time-sliced associations with the plurality of target cells according to priority metrics.

In Example 27, the subject matter of Example 21 can optionally include means for tracking previous associations with the plurality of target cells.

In Example 28, the subject matter of Example 27 can optionally include means for storing particular metrics for each target cell of the plurality of target cells with which the wireless client has been associated.

In Example 29, the subject matter of Example 27 can optionally include the particular metrics comprising a time used to associate with each target cell, a time for transitioning to each target cell, a location of each target cell, previous quality of experience with each target cell, and signal conditions associated with each target cell.

Example 30 is a method for a wireless client to perform time-sliced WiFi associations for make-before-break handover in a WiFi system, the method comprising monitoring associated metrics of a serving channel of the WiFi system to determine whether to perform time-sliced WiFi associations with a plurality of target cells each having a respective target channel, performing the time-sliced associations with the plurality of target cells on the plurality of respective target channels while maintaining an association with a serving cell on the serving channel and while masking the time-sliced association from an operating system of the wireless client, and transitioning the wireless client from the serving cell to the target cell in response to the metrics.

In Example 31, the subject matter of Example 30 can optionally include deprioritizing, in response to one or more of the metrics indicating that a resulting association with the target cell will not be adequate for the wireless client, one or more of the plurality of target cells.

In Example 32, the subject matter of Example 31 can optionally include reviewing stored metrics for remaining target cells of the plurality of target cells in response to one or more of the metrics indicating the resulting association with the target cell will not be adequate for the wireless client.

Example 33 is a wireless communication station configured to operate in a WiFi system comprising a plurality of access points, each access point having at least one associated channel, the wireless communication station comprising processing circuitry configured to control operation of the wireless communication station in response to an operating system, and a physical layer coupled to the processing circuitry and configured to scan the at least one associated channel of each of the plurality of access points while maintaining an association with a serving access point of the WiFi system, perform a time-sliced association with each access point of the plurality of access points on their at least one associated channels while maintaining an association with the serving access point on a serving channel and masking the time-sliced associations from the operating system, and the physical layer further configured to transition from the serving access point to a target access point of the plurality of access points in response to channel metrics of the at least one associated channel each of the plurality of access points.

In Example 34, the subject matter of Example 33 can optionally include the physical layer being further configured to increase a scanning rate of the at least one associate channels of the plurality of access points in response to the channel metrics.

In Example 35, the subject matter of Example 33 can optionally include the wireless communication station comprising one of: a personal digital assistant (PDA), a computer laptop with wireless communication capability, a web tablet, a wireless telephone, a smartphone, a wireless headset, a pager, an instant messaging device, a digital camera, an access point, a television, a medical device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. method for time-sliced associations for make-before-break handover in a communication system, the method comprising:
   a wireless client monitoring a serving channel of the communication system to determine whether to perform a time-sliced association;
   performing the time-sliced association with a target cell on a target channel while maintaining an association with a serving cell on the serving channel and while masking the time-sliced association from an operating system of the wireless client such that an internet protocol address associated with the target cell is not available to the operating system or active applications executing on the wireless client, wherein performing the time-sliced association with the target cell comprises performing an association, authentication, and Dynamic Host Configuration Protocol process; and
   transitioning the wireless client from the serving cell to the target cell in response to an indication of degradation in the serving channel, wherein the internet protocol address associated with the target cell is made available to the operating system and the active applications executing on the wireless client in response to the transitioning.

2. The method of claim 1 further comprising increasing a channel scanning rate of the target channel in response to one or more metrics of the serving channel.

3. The method of claim 2 wherein the one or more metrics comprise channel signal strength, end-to-end link quality and bandwidth, wireless client battery life, cost of connectivity, application choices, user preference, or measured synthetic or real application performance metrics.

4. The method of claim 2 wherein increasing the channel scanning rate of the target channel in response to the one or more metrics comprises increasing the channel scanning rate of a plurality of target channels.

5. The method of claim 1 further comprising the wireless client terminating the association with the serving cell after transitioning the wireless client to the target cell.

6. The method of claim 1 wherein performing the time-sliced association with the target cell on the target channel while maintaining the association with the serving cell on the serving channel comprises the wireless client leaving the serving channel to perform the time-sliced association with the target cell.

7. The method of claim 1 further comprising prioritizing target cells according to predetermined priority metrics.

8. A method for time-sliced WiFi associations for make-before-break handover in a WiFi system, the method comprising:
   a wireless client monitoring a serving channel, associated with a serving access point, until the serving channel indicates a degradation in serving channel quality;
   increasing a scanning rate of a plurality of target channels in response to the indication of degradation in serving channel quality, each of the plurality of target channels associated with a respective target access point of a plurality of target access points;
   performing a time-sliced association with at least one of the plurality of target access points while maintaining an association with the serving access point wherein performing the time-sliced association with the at least one of the plurality of target access points comprises performing an association, authentication, and Dynamic Host Configuration Protocol process and a respective internet protocol address associated with the at least one of the plurality of target access points is not available to an operating system of the wireless client or active applications executing on the wireless client; and
   transitioning the wireless client from the serving access point to the at least one of the plurality of target access points in response to the indication of degradation of the serving channel quality and a history of the at least one of the plurality of target access points, wherein the transitioning comprises making the respective internet protocol address associated with the at least one of the plurality of target access points available to the operating system and the active applications executing on the wireless client.

9. The method of claim 8 further comprising the wireless client storing one or more historical metrics for each of the plurality of target access points with which the wireless client has been associated.

10. The method of claim 9 wherein the one or more historical metrics comprise a time the wireless client used to associate with the each of the plurality of target access points, how quickly a transition to the each of the plurality of target access points was performed, previous quality of experience with the each of the plurality of target access points, or signal conditions associated with the each of the plurality of target access points.

11. A wireless client for operating in a communication system, the wireless client comprising:
   physical layer circuitry to scan at least one respective associated channel of at least one target access point while maintaining an association with a serving access point;
   processing circuitry to perform a time-sliced association with the at least one target access point on the at least one respective associated channel while maintaining the association with the serving access point on a serving channel and masking the time-sliced association from an operating system of the wireless client, wherein masking the time-sliced association comprises making an internet protocol address associated with the at least one target access point unavailable to the operating system or active applications executing on the wireless client, and wherein performing the time-sliced association with the at least one target access point comprises performing an association, authentication, and Dynamic Host Configuration Protocol process; and processing circuitry to control a transition from the serving access point to the at least one target access point in response to an indication of degradation in quality of the serving channel wherein the internet protocol address associated with the at least one target access point is made available to the operating system and the active applications executing on the wireless client in response to the transition.

12. The wireless client of claim 11 wherein the association with the at least one target access point comprises a Quality of Experience analysis of the at least one respective associated channel of the at least one target access point.

13. The wireless client of claim 12 wherein the wireless client further determines the Quality of Experience analysis by determining channel signal strength, end-to-end link quality, channel bandwidth, wireless client battery life, cost of connectivity, application choices, user preferences, or measured synthetic or real application performance metrics.

14. The wireless client of claim 11 wherein the serving access point and the at least one target access point have different extended service set identifications.

15. The wireless client of claim 11 wherein the serving access point and the at least one target access point have a same extended service set identification.

16. A non-transitory computer-readable storage medium that stores instructions for execution by processing circuitry of a wireless client to perform time-sliced associations for a make-before-break handover in a WiFi system, the processing circuitry is caused to:

monitor a serving channel of the WiFi system to determine whether to perform the time-sliced associations with one or more target access points over a respective one or more target channels;

perform the time-sliced associations with the one or more target access points using the respective one or more target channels while maintaining an association with a serving access point using the serving channel and while masking the time-sliced associations from an operating system of the wireless client such that a respective internet protocol address associated with the one or more target access points is not available to the operating system or active applications executing on the wireless client, wherein performing the time-sliced associations comprises performing an association, authentication, and Dynamic Host Configuration Protocol process; and transition from the serving access point to a target access point of the one or more target access points in response to an indication of degradation of quality of the serving channel, wherein the respective internet protocol address associated with the target access point is made available to the operating system and the active applications executing on the wireless client in response to the transition.

17. The non-transitory computer-readable storage medium of claim 16 wherein the processing circuitry is further caused to:

increase a channel scanning rate of the respective one or more target channels in response to one or more channel metrics.

18. The non-transitory computer-readable storage medium of claim 16 wherein the processing circuitry is further caused to:

prioritize the one or more target cells according to one or more predetermined priority metrics.

19. A wireless client to perform time sliced WiFi associations in a WiFi system, the wireless client comprising:

means for monitoring one or more metrics of a serving channel of the WiFi system to determine whether to perform the time-sliced WiFi associations;

means for performing time-sliced WiFi associations with respective ones of a plurality of target cells on a plurality of respective target channels while maintaining an association with a serving cell on the serving channel, wherein the means for performing the time-sliced associations comprises means for performing an association, authentication, and Dynamic Host Configuration Protocol process;

means for masking the time-sliced WiFi associations from an operating system of the wireless client while performing the time-sliced WiFi associations such that a respective internet protocol address associated with the plurality of target cells is not available to the operating system or active applications executing on the wireless client; and means for transitioning the wireless client from the serving cell to a target cell of the plurality of target cells in response to the one or more metrics wherein the respective internet protocol address associated with the target cell is made available to the operating system and the active applications executing on the wireless client in response to the transitioning.

20. The wireless client of claim 19 and further comprising:
means for prioritizing the time-sliced WiFi associations with the plurality of target cells according to one or more priority metrics.

* * * * *